US008804678B2

(12) United States Patent
Nakamata et al.

(10) Patent No.: US 8,804,678 B2
(45) Date of Patent: Aug. 12, 2014

(54) METHOD, APPARATUS AND COMPUTER PROGRAM FOR HANDLING HYBRID AUTOMATIC REPEAT REQUEST FAILURE

(75) Inventors: Masatoshi Nakamata, Kanagawa (JP); Tuomas T. Hakuli, Oulu (FI)

(73) Assignee: Nokia Corporation, Espoo (FI)

( * ) Notice: Subject to any disclaimer, the term of this patent is extended or adjusted under 35 U.S.C. 154(b) by 1466 days.

(21) Appl. No.: 11/702,913

(22) Filed: Feb. 5, 2007

(65) Prior Publication Data

US 2008/0026741 A1 Jan. 31, 2008

Related U.S. Application Data

(60) Provisional application No. 60/765,073, filed on Feb. 3, 2006.

(51) Int. Cl.
*H04M 3/00* (2006.01)
(52) U.S. Cl.
USPC .......................... 370/338; 455/420
(58) Field of Classification Search
USPC .................. 370/241–253, 310–350; 455/422.1–460, 524–525
See application file for complete search history.

(56) References Cited

U.S. PATENT DOCUMENTS

| 7,266,384 B2 * | 9/2007 | Kim et al. ................. 455/522 |
| 7,515,616 B2 * | 4/2009 | Yi et al. ................... 370/519 |
| 2003/0101274 A1 * | 5/2003 | Yi et al. .................. 709/232 |
| 2004/0147236 A1 * | 7/2004 | Parkvall et al. ............ 455/132 |
| 2004/0208160 A1 * | 10/2004 | Petrovic et al. ............ 370/350 |
| 2005/0039101 A1 * | 2/2005 | Torsner ..................... 714/748 |
| 2005/0053035 A1 * | 3/2005 | Kwak et al. ............... 370/331 |
| 2006/0187844 A1 * | 8/2006 | Chun et al. ................ 370/242 |
| 2007/0097937 A1 * | 5/2007 | Kubota et al. ............. 370/338 |

FOREIGN PATENT DOCUMENTS

EP 1465369 A1 10/2004

OTHER PUBLICATIONS

3GPP TS 25.427 v 6.5.0 (Dec. 2005); 3rd Generation Partnership Project; Technical Specification Group Radio Access Network: UTRAN Ibu/Iur Internace User Plane Protocol for DCH Data Streams (Release 6).
3GPP TSG-RAN3 Meeting #51, Denver USA, Feb. 13-Nov. 17, 2006, Tdoc R3-060395; 8.3.2 Synchronised Radio Link Reconfiguration Preparation.
3GPP TSG-RAN3 Meeting #51, Denver, USA, Feb. 13-Nov. 17, 2006; Tdoc R3-060394; 8.3.4 Synchronised Radio Link Reconfiguration Preparation.
"HARQ Failure Indication due to MAC-e Reset in UE", Change Request, Tdoc #R3-060393, 3GPP TSG-RAN3 Meeting #51, Denver, USA, Feb. 13-17, 2006, pp. 1-6, http://www.3gpp.org/ftp/tsg_ran/WG3_Iu/TSGR3_51/docs.

(Continued)

*Primary Examiner* — Kashif Siddiqui
(74) *Attorney, Agent, or Firm* — Squire Patton Boggs (US) LLP

(57) ABSTRACT

A method by which a Node B is informed by a serving radio network controller that a medium access control-e reset is to be performed by a user equipment in communication with the Node B, so that the Node B can then provide failure indications of all hybrid automatic repeat request processes that are not decoded by the time of the medium access control-e reset. Corresponding equipment and software are also provided.

30 Claims, 7 Drawing Sheets

(56) References Cited

OTHER PUBLICATIONS

"HARQ Failure Indication due to MAC-e Reset in UE", Change Request, Tdoc #R3—060395, 3GPP TSG-RAN3 Meeting #51, Denver, USA, Feb. 13-17, 2006, pp. 1, 4. http://qqq.3gpp.org/ftp/tsg_ran/WG3_Iu/TSGR3_51/docs.

"HARQ Retransmission and Failure Indication for Improved Outer Loop Power Control", R3-041503, 3GPP TSG RAN WG3 Meeting #45, Yokohama, Japan, Nov. 15-19, 2004, pp. 1-3 http://www.3gpp.org/ftp/tsg_ran/WG3_Iu/TSGR3_45/docs.

"Coordinated Radio Access Bearer Reconfiguration", TSGR3 #3 (99) 487, Change of TR 25.931, 3GPP TSG_RAN Working Group 3, London, UK, May 31-Jun. 3, 1999, pp. 1-2. http://www.3gpp.org/ftp/tsg_ran/WG3_Iu/TSGR3_04/Docs.

3GPP TS 25.425 V6.3.0; "$3^{rd}$ Generation Partnership Project; Technical Specification Group Radio Access Network; UTRAN Iur interface user plane protocols for Common Transport Channel data streams (Release 6)"; pp. 1-32; Sep. 2005.

3GPP TS 25.435 V6.3.0; $3^{rd}$ Generation Partnership Project; Technical Specification Group Radio Access Network; UTRAN Iub Interface user Plane Protocols for Common Transport Channel data streams (Release 6); pp. 1-43; Sep. 2005.

European Patent Office; Yuhuan Xu; "Supplementary European Search Report"; whole document; Jul. 8, 2010.

3GPP; Tdoc R3-060250; "HARQ Failure Indication due to MAC-e Reset in UE"; whole document; TSG-RAN3 meeting #51 Feb. 2-13, 2006; Denver, Colorado, USA.

European Patent Office; Yuhuan Xu; "Communication Pursuant to Article 94(3)EPC"; whole document; Jul. 28, 2010.

* cited by examiner

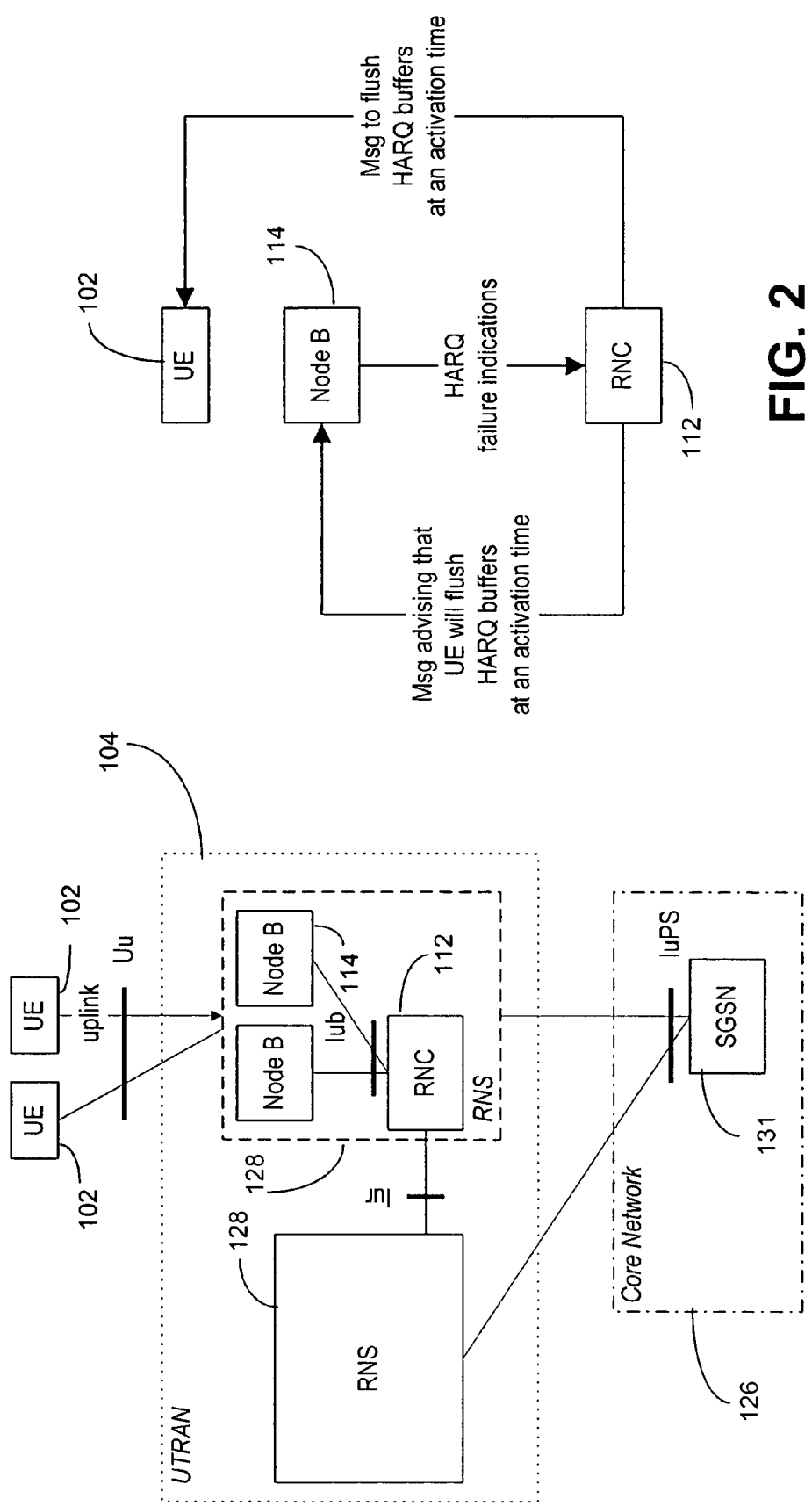

METHOD, APPARATUS AND COMPUTER PROGRAM FOR HANDLING HYBRID AUTOMATIC REPEAT REQUEST FAILURE

CROSS-REFERENCE TO RELATED APPLICATION

The present invention is based upon and claims priority to Provisional U.S. Patent Application No. 60/765,073 titled "HARQ Failure Indication Due to MAC-E Reset in UE", which was filed on Feb. 3, 2006.

FIELD OF INVENTION

The present invention relates generally to wireless communication, and more particularly to packet data communication via a wireless communication.

BACKGROUND OF INVENTION

The telecommunications industry is in the process of developing a new generation of flexible and affordable communications that includes high-speed access while also supporting broadband services. Many features of the third generation mobile telecommunications system have already been established, but many other features have yet to be perfected.

One of the systems within the third generation of mobile communications is the Universal Mobile Telecommunications System (UMTS) which delivers voice, data, multimedia, and wideband information to stationary as well as mobile customers. UMTS is designed to accommodate increased system capacity and data capability. Efficient use of the electromagnetic spectrum is vital in UMTS. It is known that spectrum efficiency can be attained using frequency division duplex (FDD) or using time division duplex (TDD) schemes. Space division duplex (SDD) is a third duplex transmission method used for wireless telecommunications.

As can be seen in FIG. 1 and FIG. 2, the UMTS architecture consists of user equipment 102 (UE), the UMTS Terrestrial Radio Access Network 104 (UTRAN), and the Core Network 126 (CN). The air interface between the UTRAN and the UE is called Uu, and the interface between the UTRAN and the Core Network is called Iu.

The UTRAN consists of a set of Radio Network Subsystems 128 (RNS), each of which has geographic coverage of a number of cells (C). The interface between the subsystems is called Iur.

Each Radio Network Subsystem 128 (RNS) includes a Radio Network Controller 112 (RNC) and at least one Node B 114, each Node B having geographic coverage of at least one cell. As can be seen from FIG. 6, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop towers or preferably at less visible locations). The RNC 112 has overall control of the logical resources of each Node B 114 within the RNS 128, and the RNC 112 is also responsible for handover decisions which entail switching a call from one cell to another or between radio channels in the same cell. The one or more possible RNSs 128 interface with the core network 126, and in particular, with a serving GPRS support node SGSN 131 of the core network.

When a RNC (Radio Network Controller) has a RRC (Radio Resource Control) connection with a UE (User Equipment), it is known as the Serving Radio Network Controller (SRNC) for that UE. The SRNC is responsible for the users mobility within the UTRAN and is also the point of connection towards the CN (Core Network).

Typically, the interface between a user equipment (UE) and the UTRAN has been realized in the related art through a radio interface protocol established in accordance with radio access network specifications describing a physical layer (L1), a data link layer (L2) and a network layer (L3). These layers are based on the lower three layers of an open system interconnection (OSI) model that is well known in communications systems.

For example, the physical layer (PHY) provides information transfer service to a higher layer and is linked via transport channels to a medium access control (MAC) layer. Data travels between the Medium Access Control (MAC) layer at L2 and the physical layer at L1, via a transport channel. The MAC layer is the lower of the two sublayers of the Data Link Layer. The transport channel is divided into a dedicated transport channel and a common transport channel depending on whether a channel is shared. Also, data transmission is performed through a physical channel between different physical layers, namely, between physical layers of a sending side (transmitter) and a receiving side (receiver).

In this example of a typical system in the related art, the second layer L2 includes the MAC layer, a radio link control (RLC) layer, a broadcast/multicast control (BMC) layer, and a packet data convergence protocol (PDCP) layer. The MAC layer maps various logical channels to various transport channels. The MAC layer also multiplexes logical channels by mapping several logical channels to one transport channel. The MAC layer is connected to an upper RLC layer via the logical channel. The logical channel can be divided into a control channel for transmitting control plane information, and a traffic channel for transmitting user plane information according to the type of information transmitted. The term "traffic" can sometimes be understood to cover control information, but in this present specification the term "traffic signal" will refer to a data signal in the user plane.

The MAC layer within L2 is divided into a MAC-b sublayer, a MAC-d sublayer, a MAC-c/sh sublayer, a MAC-hs sublayer and a MAC-e sublayer according to the type of transport channel being managed. The MAC-b sublayer manages a broadcast channel (BCH), which is a transport channel handling the broadcast of system information. The MAC-c/sh sublayer manages common transport channels such as an FACH (Forward Access Channel) or a DSCH (Downlink Shared Channel) that is shared by other terminals. The MAC-d sublayer handles the managing of a DCH (Dedicated Channel), namely, a dedicated transport channel for a specific terminal. The DCH is a portion of a Traffic Channel (forward or reverse) that carries a combination of user data, signaling, and power control information.

In order to support uplink and downlink high speed data transmissions, the MAC-hs sublayer manages an HS-DSCH (High Speed Downlink Shared Channel), namely, a transport channel for high speed downlink data transmission, and the MAC-e sublayer manages an E-DCH (Enhanced Dedicated Channel), namely, a transport channel for high speed uplink data transmissions.

In this example of a typical related art system, a radio resource control (RRC) layer located at the lowest portion of the third layer (L3) controls the parameters of the first and second layers with respect to the establishment, reconfiguration and release of radio bearers (RBs). The RRC layer also controls logical channels, transport channels and physical channels. Here, the RB refers to a logical path provided by the first and second layers of the radio protocol for data transmission between the terminal and the UTRAN. In general, the establishment of the RB refers to stipulating the characteristics of a protocol layer and a channel required for providing a specific data service, and setting their respective detailed parameters and operation methods.

A typical HSUPA (High Speed Uplink Packet Access) of the related art will now be briefly described. HSUPA is a system allowing a terminal or UE to transmit data to the UTRAN via the uplink at a high speed. The HSUPA employs an enhanced dedicated channel (E-DCH), instead of the related art dedicated channel (DCH), and also uses a HARQ (Hybrid Automatic Repeat Request) and AMC (Adaptive Modulation and Coding), required for high-speed transmissions, and a technique such as a Node B-controlled scheduling. For the HSUPA, the Node B transmits to the terminal downlink control information for controlling the E-DCH transmission of the terminal. The downlink control information includes response information (ACK/NACK) for the HARQ, channel quality information for the AMC, E-DCH transmission rate allocation information for the Node B-controlled scheduling, E-DCH transmission start time and transmission time interval allocation information, transport block size information, and the like. The terminal transmits uplink control information to the Node B. The uplink control information includes E-DCH transmission rate request information for Node B-controlled scheduling, UE buffer status information, UE power status information, and the like. The uplink and downlink control information for the HSUPA are transmitted via physical control channels such as an E-DPCCH (Enhanced Dedicated Physical Control Channel) in the uplink and E-HICH (HARQ acknowledgement Indication channel), E-RGCH (Relative Grant channel) and E-AGCH (Absolute Grant channel) in the downlink. For the HSUPA, a MAC-d flow is defined between the MAC-d and MAC-e. Here, a dedicated logical channel such as a DCCH (Dedicated Control Channel) or a DTCH (Dedicated Traffic Channel) is mapped to the MAC-d flow. The MAC-d flow is mapped to the transport channel E-DCH and the transport channel E-DCH is mapped to the physical channel E-DPDCH (Enhanced Dedicated Physical Data Channel). The dedicated logical channel can also be directly mapped to the transport channel DCH. In this case, the DCH is mapped to the physical channel DPDCH (Dedicated Physical Data Channel).

The present invention deals with a problem related to HSUPA and E-DCH, in the context of packet data traffic in Release 6 of 3GPP. A HARQ Failure Indication has been introduced in the document "3GPP TS 25.427, V6.5.0 (2005-12), UTRAN Iub/Iur interface user plane protocol for DCH Data Streams (Relaese 6)" which is incorporated by reference herein in its entirety. That failure indication is for improving OLPC (outer loop power control), by providing the number of retransmissions before a failure occurs.

The conditions that must prevail in order to send a failure indication are as follows. The serving Node B shall send a HARQ Failure Indication to the SRNC if a MAC-e protocol data unit (PDU) for a HARQ process has not yet been successfully decoded and the Retransmission Sequence Number (RSN) indicates the transmission of a new MAC-e PDU for the same HARQ process and the number of HARQ retransmissions that had already occurred was equal or higher than the lowest of the maximum HARQ retransmissions values for the UE's configured MAC-d flows. The serving Node B shall also send a HARQ Failure Indication to the SRNC if a MAC-e PDU for a HARQ process has not yet been successfully decoded and the maximum retransmissions for the MAC-d flow with the highest maximum HARQ retransmissions value valid for the UE connection have occurred, or should have occurred in case the HARQ related outband signalling (RSN) on the E-DPCCH could not be decoded.

There is a need to improve HARQ Failure Indications when a MAC-e reset is performed by a UE, which SRNC requests the UE to perform a flush/reset of all HARQ process for E-DCH, for improving OLPC. In case a UE is requested to perform the MAC-e reset, the UE resets all data in the buffer, i.e. the data for all HARQ processes (for E-DCH) not yet completed.

For example, FIG. 3 shows an Iub/Iur transmission when MAC-e reset is performed. As indicated in FIG. 3, a UE is configured to have one E-DCH MAC-d flow with maximum number of retransmission is set to 4. The Node B could not successfully decode the E-DCH data (MAC-e) with RSN=3 (actual number of the retransmission is 3) for a certain process and sends the UE NACK. However, before UE retransmits the data with RSN=3 (actual number of the retransmission is 4), UE performs the MAC-e reset and UE sends new data (MAC-e) with RSN=0 for the process. In the above example, at reception of new data in the Node B, the Node B does not send the HARQ Failure Indication since the two conditions noted above are not met. The SRNC executes OLPC calculation without data transmission at the processes 110 and 115. The SRNC has no information on how many retransmissions have occurred for the processes not yet completed before the MAC-e reset is performed by the UE. This degrades OLPC performance, especially when 10 ms transmission time interval (TTI) is used over air interface, as in FIG. 3.

It is assumed here that RNC will execute OLPC calculation every few hundred ms, such as every 200 ms. The transmission time interval TTI is the inter-arrival time of TBS (Transport Block Set), and is equal to the periodicity at which a Transport Block Set is transferred by the physical layer on the radio interface. It is always a multiple of the minimum interleaving period (e.g. 10 ms, the length of one Radio Frame RF). The MAC (Medium Access Control) delivers one Transport Block Set to the physical layer every TTI.

The serving Node B, which sends HARQ Failure Indications, has insufficient information to determine whether the termination of a HARQ process before it is completed is due to a MAC-e reset requested by SRNC or because of some other reason, such as NACK-ACK Error, especially, in SHO (soft handover) cases.

In addition, in case UE performs a MAC-e reset and a 2 ms TTI is used over the air interface and 10 ms is used over Iub/Iur, there is the possibility that one E-DCH DATA FRAME needs to include five 2 ms correct data frames and five HARQ Failure Indications, which require a total of ten sub frames, but it is not possible to include 10 sub frames in one E-DCH DATA FRAME according to the prior art, since the maximum number of sub frames in one E-DCH DATA FRAME is eight according to the prior art.

SUMMARY OF INVENTION

According to the invention, the controller (SRNC) tells the Node B that the UE will execute a MAC-e reset. The invention also includes the idea that the Node B sends to the SRNC a HARQ Failure Indication if data was not decoded by the time of that MAC-e reset.

Methods, apparatus and software to implement this invention will primarily be used at the SRNC and at the Node B. This invention solves the problem of the serving Node B, which sends HARQ failure indications, having insufficient information to determine whether the termination of a HARQ process before it is completed is due to a MAC-e reset requested by SRNC or because of some other reason.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a block diagram of a wireless communication system and a UE communicatively coupled to same via a radio access network including a Node B and a RNC of a type that could be operative according to the invention.

FIG. 2 is a block diagram of the portion of the wireless communication system of FIG. 1 showing the components that perform signaling according to the invention, and providing a simplified representation of the signaling.

BEST MODE FOR CARRYING OUT THE INVENTION

Figure 3:
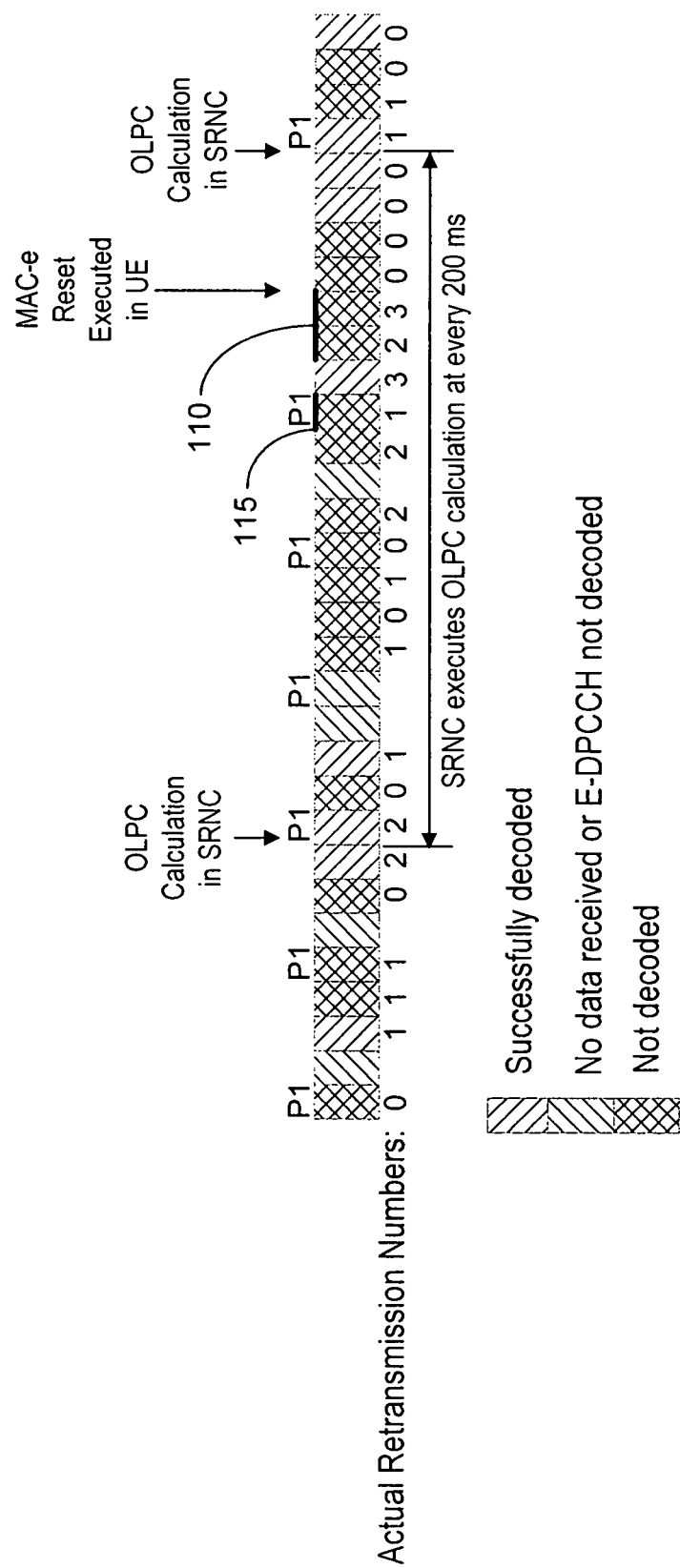
FIG. 3 is a schematic of one Iub/Iur transmission when MAC-e reset is performed.

A preferred embodiment of the present invention will now be described. This is merely to illustrate one way of implementing the invention, without limiting the scope or coverage of what is described elsewhere in this application. It is to be understood that the following inventive concept can be implemented in the context of other applicable systems.

Referring now again to FIG. 1, the Node B 114 is shown as one Node B among others controlled by the Radio Network Controller (RNC) 112 (via typically wireline connections) and in communication with a UE 102 (as well as possibly other UEs) via wireless communication. The RNC and the various Node B's constitute the Radio Network System (RNS) 128. The UMTS radio access network (UTRAN) 104 is constituted by the RNS as well as possibly other RNSs. The one or more possible RNS's interface with the core network 126, and in particular, with a serving GPRS support node (SGSN) 131 of the core network.

According to the invention, a SRNC informs a Node B when a UE is to perform a MAC-e reset for E-DCH, i.e. a reset of the buffer used for HARQ processing for HSUPA (E-DCH) but not HSDPA, and the Node B (i.e. the radio link interface for a radio access network of an UMTS network) then provides a failure indication which contains the number of HARQ retransmissions that occurred for each HARQ process not decoded by the time of the MAC-e reset.

A Node B Application Part (NBAP) is the application protocol used between the RNC (Radio Network Controller) and the Node B. NBAP is used to configure and manage the Node B and setup channels on the Iub (Node B/RNC) and Uu (Node B/UE) interfaces. Radio Network Subsystem Application Part (RNSAP) is Radio Network Signaling over the Iur (RNC/RNC) interface in a UMTS system.

The following is an exemplary signaling sequence according to the invention. As a first step, the SRNC sends to Node B, via the control plane protocols NBAP and/or RNSAP, a RADIO LINK RECONFIGURATION PREPARE with MAC-e Reset Indicator information element (IE). As a second step, the Node B sends to SRNC (via NBAP and/or RNSAP) a RADIO LINK RECONFIGURATION READY. As a third step, the SRNC sends to Node B (via NBAP and/or RNSAP) a RADIO LINK RECONFIGURATION COMMIT with Connection Frame Number (CFN). As a fourth step, the SRNC sends to UE (via RRC) a Reconfiguration message (e.g. a PHYSICAL CHANNEL RECONFIGURATION) with HARQ Flush and activation time. As a fifth step, the UE sends to SRNC (via RRC) a Reconfiguration Response (e.g. a PHYSICAL CHANNEL RECONFIGURATION COMPLETE). As a sixth step, the UE performs MAC-e Reset at given activation time. As a seventh step, the Node B sends to SRNC (via e.g. frame protocol) a HARQ Failure Indication which contains the number of HARQ retransmissions that occurred for each HARQ process not decoded by the time of the MAC-e reset. Frame protocol (FP) is a protocol used in UMTS on the Iur and Iub interfaces to frame channels supported between the SRNC (Serving Radio Network Controller) and UE (User Equipment).

Thus, in the first step, the SRNC tells the Node B that the UE will execute a MAC-e Reset (in the near future, at a time not yet determined when the first step is performed). In the third step the SRNC tells the Node B the activation time/CFN (which it then tells the UE in the fifth step). This handshaking allows the SRNC to decide the activation time after the Node B is ready, and it also allows the SRNC to take into account the latest conditions affecting communication in deciding the timing. If instead the SRNC tells the Node B the activation time at the first step, there is the possibility that time at which the MAC-e reset is to be performed will pass before the SRNC receives an acknowledgement message from the UE.

FIG. 2 provides a simplified illustration of the signaling according to the invention, showing the serving RNC advising the Node B that the UE will perform a buffer reset (i.e. a MAC-e buffer reset) at a time indicated in the message (an activation time), and commanding the UE to perform the buffer reset at the indicated time. After the indicated time, the Node B sends HARQ failure indications to the serving RNC (for each HARQ process that had not been successfully decoded by the time of the buffer reset).

Regarding indication of MAC-e Reset from SRNC to Node B, in order to inform the Node B that the MAC-e Reset is executed in the UE, the indication can be signaled via the control plane by NBAP/RNSAP. Alternatively, the indication can be signalled via the user plane by FP (TS25.427 or TS25.425/435) over Iub/Iur.

According to the control plane approach NBAP/RNSAP of signalling the indication, the one new IE (ex the name of the IE is MAC-e Reset Indicator) is, according to one embodiment of the invention, included in the RADIO LINK RECONFIGURATION PREPARE and RADIO LINK RECONFIGURATION REQUEST message. After the reception of response messages for the request in SRNC, SRNC sends UE RRC Reconfiguration message with HARQ Flush IE.

According to the user plane approach FP of signalling the indication, a new FP procedure or a new FP header IE (e.g. a "MAC-e Reset in UE") is introduced into DCH DATA FRAME or HS-DSCH DATA FRAME. Alternatively, an existing procedure can be enhanced to contain MAC-e Reset information.

Figure 4:
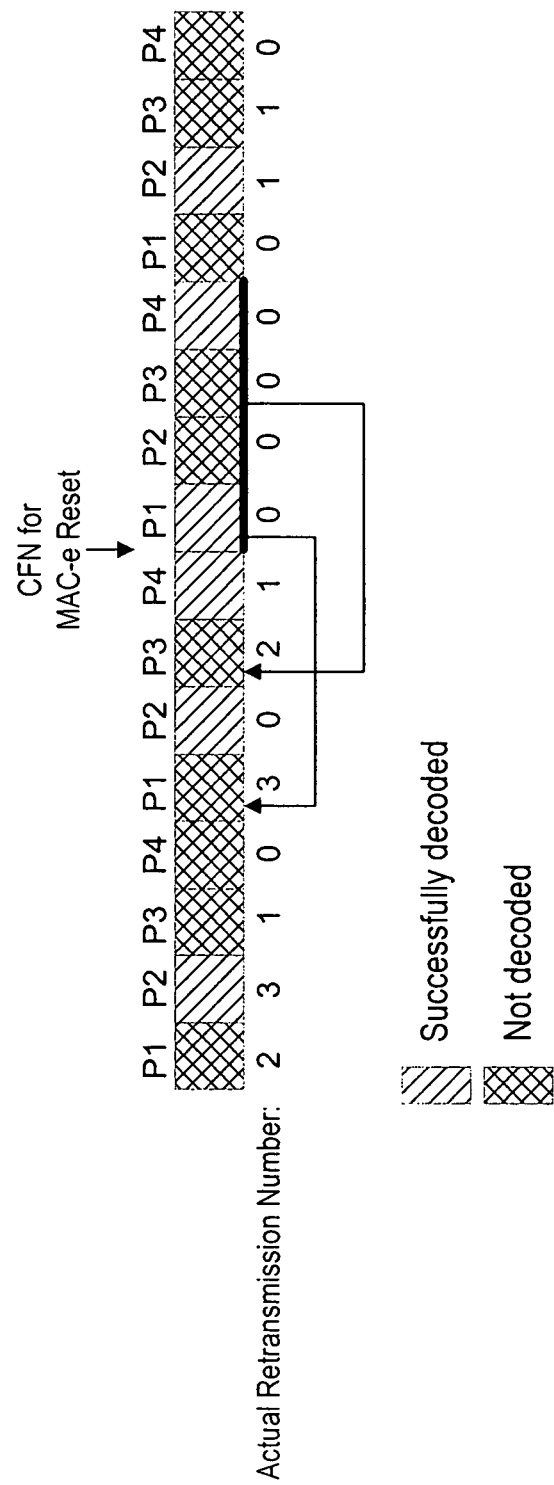
FIG. 4 is a schematic of one Iub/Iur transmission when MAC-e reset is performed according to the invention, and timing for Node B sending HARQ Failure Indications is either according to alternatives I and II described below.

FIG. 4 shows one Iub/Iur transmission when MAC-e reset is performed according to the present invention, and timing for Node B sending HARQ Failure Indications is either according to alternatives I and II described herein. As in FIG. 3, a UE is configured to have one E-DCH MAC-d flow with maximum number of retransmission is set to 4, with a 10 ms transmission time interval (TTI) used over air interface. The Iub/Iur E-DCH transmissions for four processes after CFN are as follows. P1: Node B sends E-DCH DATA FRAME including correct data with "0" (number of retransmissions) and a failure indication with "3". P2: Node B does not send E-DCH DATA FRAME (no data and HARQ indication). P3: Node B sends E-DCH DATA FRAME including Failure indication with "2" (no data). P4: Node B sends E-DCH DATA FRAME including correct data with "0" (no HARQ indication).

Regarding HARQ Failure Indication due to MAC-e reset in UE, after the CFN (which is the activation time for MAC-e reset in UE) is elapsed, the Node B sends HARQ Failure Indication (information on how many retransmissions have occurred before the CFN) for all the HARQ processes that have not successfully decoded. The failure indication can be sent immediately in its first TTI for each process, as in FIG. 4 and FIG. 5 (this is Alternative I). Alternatively, the failure indication can be sent at the time when Node B receives the first MAC-e PDU for each process, as in FIG. 4 and FIG. 6 (this is Alternative II).

Figure 5:
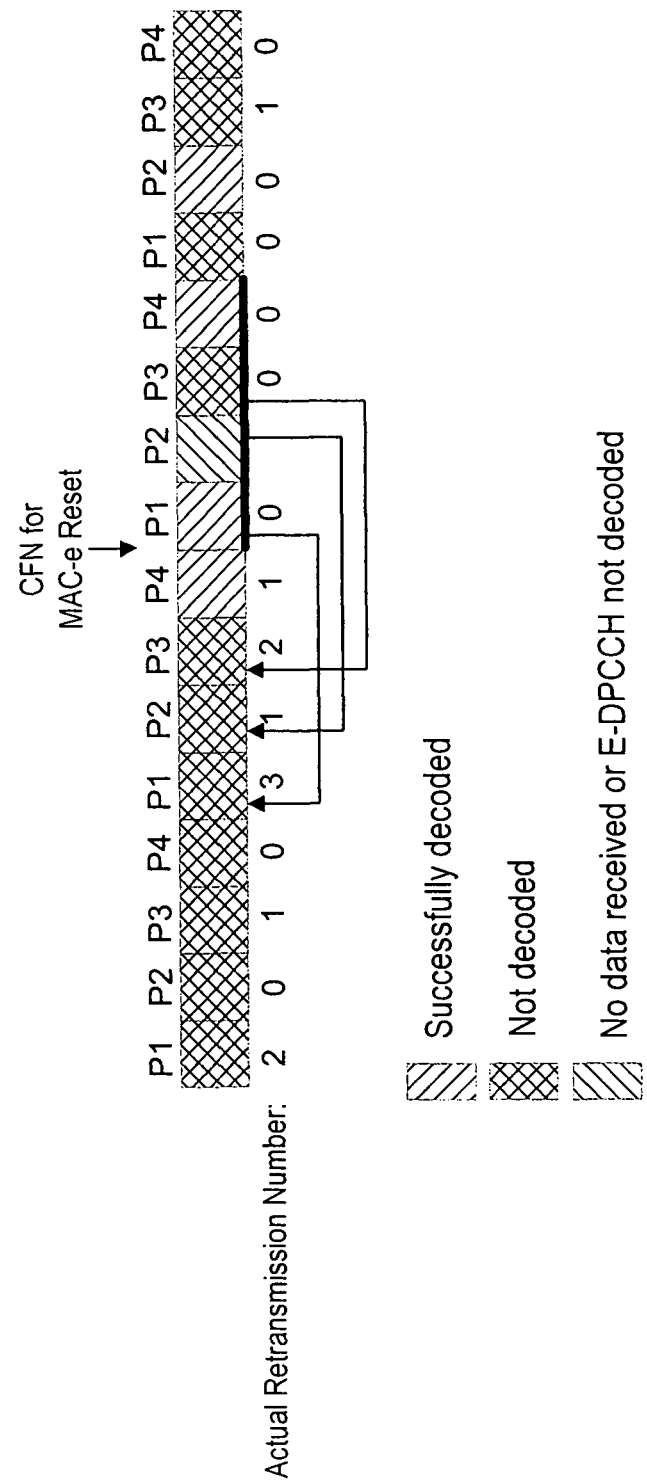
FIG. 5 is a schematic of one Iub/Iur transmission example when MAC-e reset is performed according to the invention, and timing for Node B sending HARQ Failure Indications is according to alternative I described below.

FIG. 5 (corresponding to Alternative I) shows one Iub/Iur transmission example when MAC-e reset is performed according to the invention, and timing for Node B sending HARQ Failure Indications is according to Alternative I. The Iub/Iur E-DCH transmissions for four processes after CFN are as follows. P1: Node B sends E-DCH DATA FRAME including correct data with "0" (number of retransmissions) and a failure indication with "3". P2: Node B sends E-DCH DATA FRAME including failure indication with "1" (no data). P3: Node B sends E-DCH DATA FRAME including Failure indication with "2" (no data). P4: Node B sends E-DCH DATA FRAME including correct data with "0" (no HARQ indication).

Figure 6:
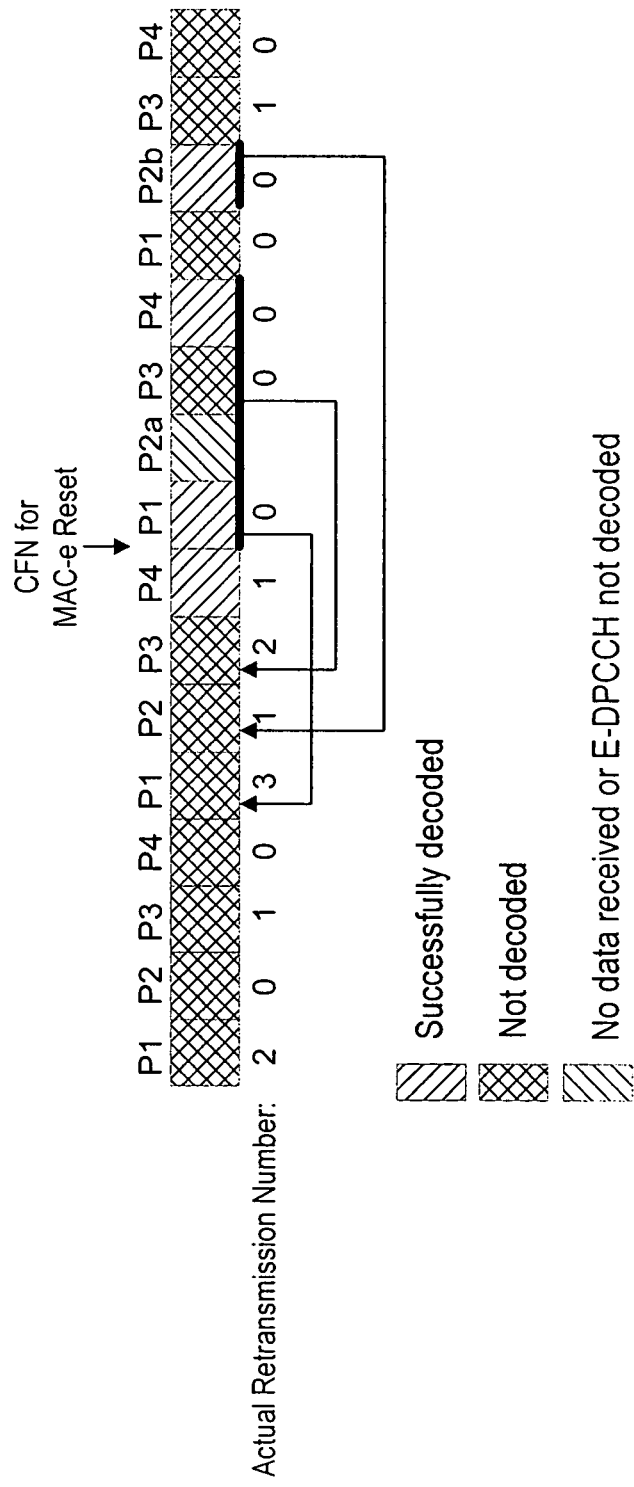
FIG. 6 is a schematic of one Iub/Iur transmission example when MAC-e reset is performed according to the invention, and timing for Node B sending HARQ Failure Indications is according to alternative 2 described below.

FIG. 6 shows one Iub/Iur transmission example when MAC-e reset is performed according to the invention, and timing for Node B sending HARQ Failure Indications is according to Alternative II. The Iub/Iur E-DCH transmissions for four processes after CFN and P2b are as follows. P1: Node B sends E-DCH DATA FRAME including correct data with "0" (number of retransmissions) and a failure indication with "3". P2a: Node B does not send E-DCH DATA FRAME (no data and HARQ indication). P3: Node B sends E-DCH DATA FRAME including Failure indication with "2" (no data). P4: Node B sends E-DCH DATA FRAME including correct data with "0" (no HARQ indication). P2b: Node B sends E-DCH DATA FRAME including correct data with "0" and failure indication with "1".

Regarding a solution for ten (10) sub frames in one E-DCH DATA FRAME, 3 bits are allocated to the Number of Subframes IE according to the related art. According to this embodiment of the present invention, in order to include 10 sub frames (five for correct data frame and five for HARQ Failure Indication) in one E-DCH DATA FRAME, 4 bits are allocated to Number of Subframes IE. As an alternative, a spare bits IE is used to include a HARQ Failure Indication due to MAC-e Reset.

Figure 7B:
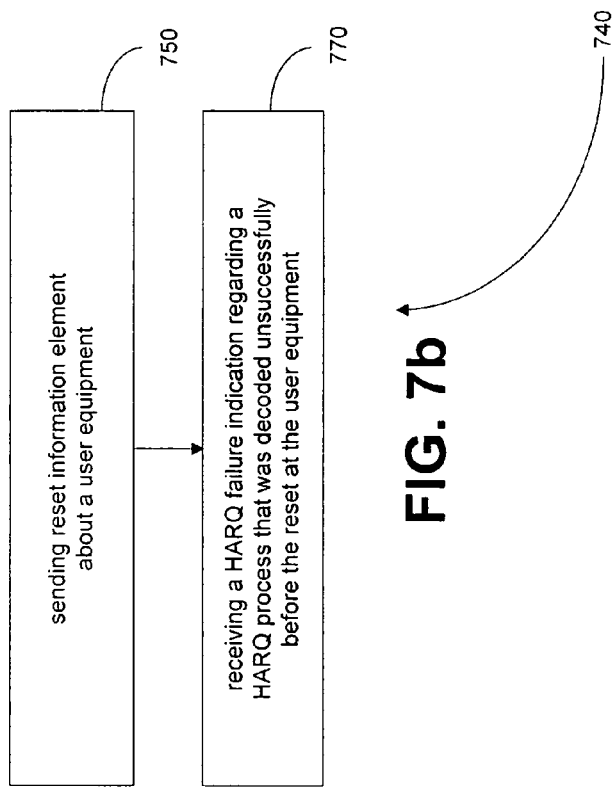
FIGS. 7a and 7b are flow charts illustrating methods according to an embodiment of the present invention.
Figure 7A:
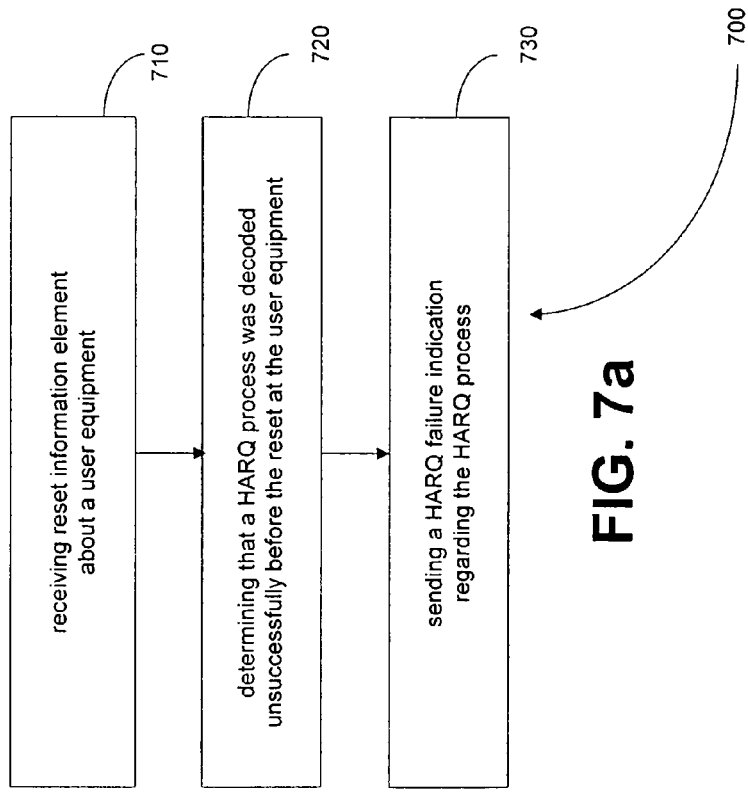

Turning now to FIG. 7a, a method 700 is shown for implementation at a Node B. A reset information element is received 710, and then it is determined 720 whether a HARQ process was decoded unsuccessfully prior to the reset. If so, a HARQ failure indication is sent 730. Likewise, FIG. 7b shows a method 740 for implementation at an RNC. Reset information is sent 750 to the Node B, and subsequently a HARQ failure indication is received 770 in response.

Figure 8:
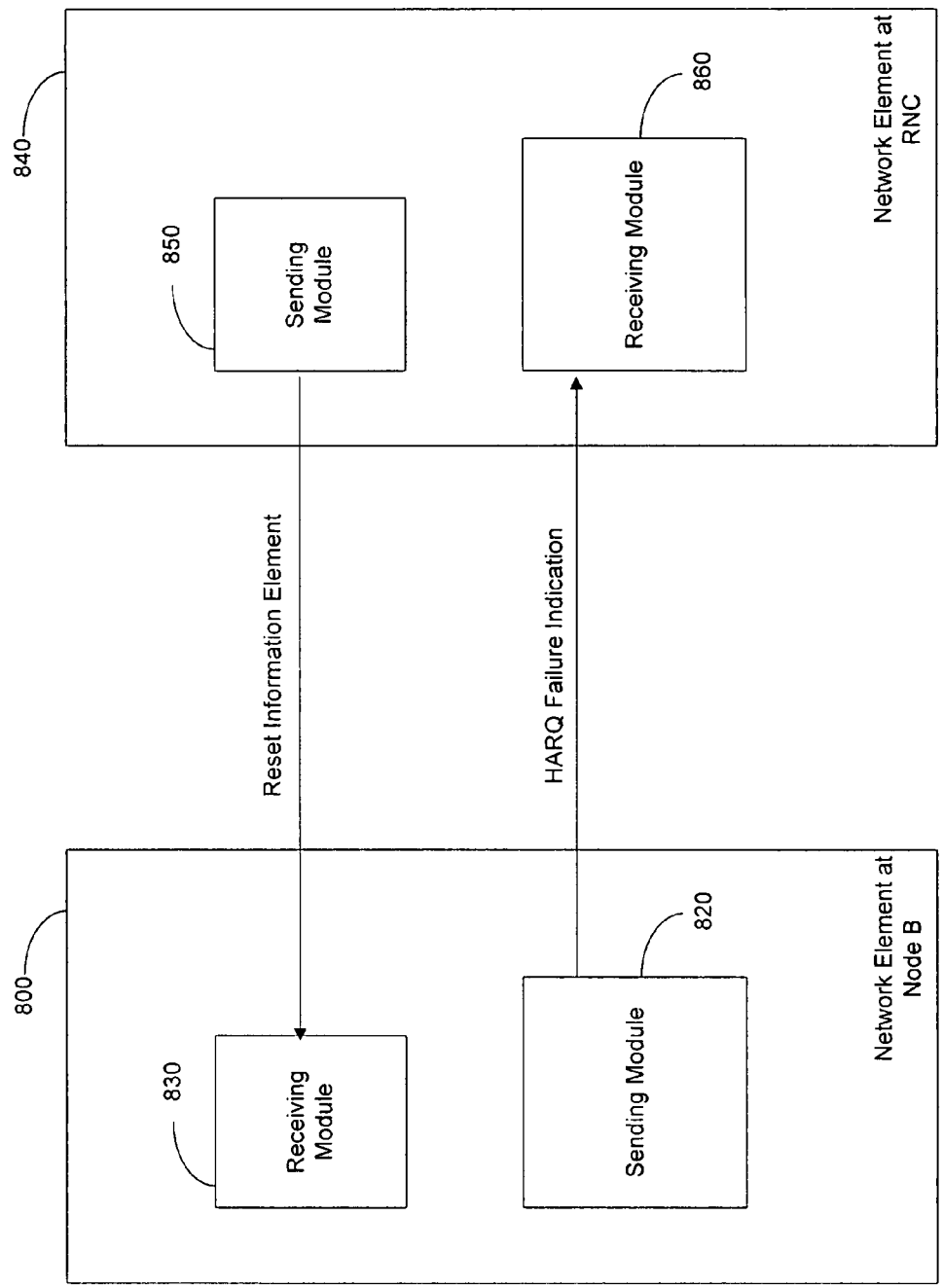
FIG. 8 is a block diagram illustrating a system according to the present invention.

FIG. 8 illustrates a simplified system according to this invention, including a network element 800 at a Node B, as well as a network element 840 at an RNC. Each of these two network elements includes a receiving module and a sending module. The sending module 850 at the RNC sends a reset information element to the receiving module 830 at the Node B. Subsequently, a sending module 820 at the Node B sends a HARQ failure indication to a receiving module 860 at the RNC.

The embodiments described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes a CPU processor comprising a single processing unit, multiple processing units capable of parallel operation, or the CPU can be distributed across one or more processing units in one or more locations, e.g., on a client and server. A memory may comprise any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

It is to be understood that the present figures, and the accompanying narrative discussions of best mode embodiments, do not purport to be completely rigorous treatments of the method, system, mobile device, and software product under consideration. A person skilled in the art will understand that the steps and signals of the present application represent general cause-and-effect relationships that do not exclude intermediate interactions of various types, and will further understand that the various steps and structures and arrangements described in this application are only illustrative of the application of the principles of the present invention, and can be implemented by a variety of different sequences and configurations, using various different combinations of hardware and software which need not be further detailed herein. Numerous modifications and alternative arrangements may be devised by those skilled in the art without departing from the scope of the present invention, and the appended claims are intended to cover such modifications and arrangements.

What is claimed is:
1. A method, comprising:
receiving at a base station of a radio access network of a telecommunication system, from a controller of the radio access network, a reset information element indicating a time when a user equipment coupled to the base station will perform a reset of buffers used in hybrid automatic repeat request processing for communication on an uplink channel; and
sending from the base station to the controller a hybrid automatic repeat request failure indication for a hybrid automatic repeat request process that was not decoded successfully before the buffer reset in the user equipment.

2. A method as in claim 1, wherein the buffer reset is a medium access control layer entity reset for the uplink channel which is an enhanced dedicated channel.

3. A method as in claim 1, wherein the base station receives the reset information element from the controller in a control plane message.

4. A method as in claim 3, wherein the reset information is provided via at least one application part protocol.

5. A method as in claim 1, wherein the base station receives the reset information element from the controller in a user plane message.

6. A method as in claim 5, wherein the reset information is provided via a header component of a user plane message.

7. A method as in claim 5, wherein the reset information is provided via a frame protocol message.

8. A method as in claim 1, wherein in communicating the failure indication, four bits are allocated to a Number of Subframes field.

9. A method, comprising:
sending to a base station of a radio access network of a telecommunication system, from a controller of the radio access network, a reset information element indicating when a user equipment coupled to the base station will perform a reset of buffers used in hybrid automatic repeat request processing for communication on an uplink channel; and
receiving from the base station, at the controller, a hybrid automatic repeat request failure indication for a hybrid automatic repeat request process that was not decoded successfully before the buffer reset in the user equipment.

10. A method as in claim 9, wherein the buffer reset is a medium access control layer entity reset for the uplink channel which is an enhanced dedicated channel.

11. A method as in claim 9, wherein the base station receives the reset information element from the controller in a control plane message.

12. A method as in claim 11, wherein the reset information is provided via at least one application part protocol.

13. A method as in claim 9, wherein the base station receives the reset information element from the controller in a user plane message.

14. A method as in claim 13, wherein the reset information is provided via a header component of a user plane message.

15. A method as in claim 13, wherein the reset information is provided via a frame protocol message.

16. A method as in claim 9, wherein in communicating the failure indication, four bits are allocated to a Number of Subframes field.

17. An apparatus, comprising means for performing the steps of the methods of claim 1.

18. A controller of a radio access network, comprising means for performing the steps of the methods of claim 9.

19. A computer program product comprising a non-transitory computer readable storage structure embodying computer program code thereon for execution by a computer processor, wherein said computer program code comprises instructions for performing a method according to claim 1.

20. A computer program product comprising a non-transitory computer readable storage structure embodying computer program code thereon for execution by a computer processor, wherein said computer program code comprises instructions for performing a method according to claim 9.

21. An application specific integrated circuit provided so as to perform a method according to claim 1.

22. An application specific integrated circuit provided so as to perform a method according to claim 9.

23. A network element, comprising:
means for receiving at the network element of a radio access network of a telecommunication system, from a controller of the radio access network, a reset information element indicating a time when a user equipment coupled to the network element will perform a reset of buffers used in hybrid automatic repeat request processing for communication on an uplink channel; and
means for sending from the network element to the controller a hybrid automatic repeat request failure indication for a hybrid automatic repeat request process that was not decoded successfully before the buffer reset in the user equipment.

24. The network element of claim 23, wherein the buffer reset is a medium access control layer entity reset for the uplink channel which is an enhanced dedicated channel.

25. A network element, comprising:
means for sending to a base station of a radio access network of a telecommunication system, from the network element of the radio access network, a reset information element indicating a time when a user equipment coupled to the base station will perform a reset of buffers used in hybrid automatic repeat request processing for communication on an uplink channel; and
means for receiving from the base station, at the network element, a hybrid automatic repeat request failure indication for a hybrid automatic repeat request process that was not decoded successfully before the buffer reset in the user equipment.

26. The network element of claim 25, wherein the buffer reset is a medium access control layer entity reset for the uplink channel which is an enhanced dedicated channel.

27. A network element, comprising:
a receiving module configured to receive at the network element of a radio access network of a telecommunication system, from a controller of the radio access network, a reset information element indicating a time when a user equipment coupled to the network element will perform a reset of buffers used in hybrid automatic repeat request processing for communication on an uplink channel; and
a sending module configured to send from the network element to the controller a hybrid automatic repeat request failure indication for a hybrid automatic repeat request process that was not decoded successfully before the buffer reset in the user equipment.

28. The network element of claim 27, wherein the buffer reset is a medium access control layer entity reset for the uplink channel which is an enhanced dedicated channel.

29. A network element, comprising:
a sending module configured to send to a base station of a radio access network of a telecommunication system, from the network element of the radio access network, a reset information element indicating when a user equipment coupled to the base station will perform a reset of buffers used in hybrid automatic repeat request processing for communication on an uplink channel; and
a receiving module configured to receive from the base station, at the network element, a hybrid automatic repeat request failure indication for a hybrid automatic repeat request process that was not decoded successfully before the buffer reset in the user equipment.

30. The network element of claim 29, wherein the buffer reset is a medium access control layer entity reset for the uplink channel which is an enhanced dedicated channel.

* * * * *